US012509665B2

(12) United States Patent
Liu

(10) Patent No.: US 12,509,665 B2
(45) Date of Patent: Dec. 30, 2025

(54) THIOREDOXIN MUTANT, PREPARATION METHOD THEREOF, AND APPLICATION THEREOF IN PRODUCTION OF RECOMBINANT FUSION PROTEIN

(71) Applicant: CHENGDU ENZPRO BIOTECHNOLOGY CO., LTD, Sichuan (CN)

(72) Inventor: Yi Liu, Sichuan (CN)

(73) Assignee: CHENGDU ENZPRO BIOTECHNOLOGY CO., LTD, Sichuan (CN)

( * ) Notice: Subject to any disclaimer, the term of this patent is extended or adjusted under 35 U.S.C. 154(b) by 750 days.

(21) Appl. No.: 17/597,140

(22) PCT Filed: Jul. 8, 2019

(86) PCT No.: PCT/CN2019/095114
§ 371 (c)(1),
(2) Date: Dec. 27, 2021

(87) PCT Pub. No.: WO2020/258372
PCT Pub. Date: Dec. 30, 2020

(65) Prior Publication Data

US 2022/0411764 A1 Dec. 29, 2022

(30) Foreign Application Priority Data

Jun. 25, 2019 (CN) ......................... 201910557170.2

(51) Int. Cl.
*C12N 9/02* (2006.01)
*C07K 14/605* (2006.01)

(52) U.S. Cl.
CPC .......... *C12N 9/0051* (2013.01); *C07K 14/605* (2013.01); *C12Y 108/01008* (2013.01); *C07K 2319/35* (2013.01)

(58) Field of Classification Search
CPC ................ C12N 9/0051; C07K 14/605; C07K 2319/35; C12Y 108/01008
See application file for complete search history.

(56) References Cited

U.S. PATENT DOCUMENTS 8,852,886 B2 * 10/2014 Dubois ................ C12N 9/0036 435/68.1
2003/0166518 A1 9/2003 Beardslee et al.

FOREIGN PATENT DOCUMENTS

| | | | | |
|---|---|---|---|---|
| CN | 108912221 A * | 11/2018 | ............. C07K 14/47 |
| JP | 2003274944 A | 9/2003 | |
| WO | 9824472 A1 | 6/1998 | |
| WO | 2004013283 A2 | 2/2004 | |
| WO | 2004013283 A3 | 8/2005 | |
| WO | 2010056901 A2 | 5/2010 | |
| WO | WO-2012009693 A1 * | 1/2012 | ......... C12N 15/1089 |

OTHER PUBLICATIONS

Kouwen et al (J Mol Biol. Jun. 6, 2008; 379(3-2): 520-534) (Year: 2008).*
Li et al (Uniprot accession No. P14949; disclosed in "Conformational fluctuations coupled to the thiol-disulfide transfer between thioredoxin and arsenate reductase in Bacillus subtilis". J Biol Chem. Apr. 13, 2007;282(15):11078-83) (Year: 2007).*
Rozanov et al (GenBank accession No. KFL15614.1; Aug. 25, 2014; Retrieved from https://www.ncbi.nlm.nih.gov/protein/KFL15614.1?report=genbank&log$=prottop&blast_rank=1&RID=CT37EHCD013) (Year: 2014).*
Singh et al (Curr. Protein Pept. Sci, 18:1-11; 2017) (Year: 2017).*
Nisthal et a (Proc Natl Acad Sci U S A. Aug. 13, 2019;116(33):16367-16377) (Year: 2019).*
Li et al (Conformational fluctuations coupled to the thiol-disulfide transfer between thioredoxin and arsenate reductase in Bacillus subtilis. J Biol Chem. Apr. 13, 2007;282(15):11078-83) (Year: 2007).*
Sanz-Barrio et al. (Chaperone-like properties of tobacco plastid thioredoxins f and m, Journal of Experimental Botany, vol. 63, Issue 1, Jan. 2012, pp. 365-379) (Year: 2012).*

* cited by examiner

*Primary Examiner* — Thomas J. Visone
*Assistant Examiner* — Georgiana C Reglas
(74) *Attorney, Agent, or Firm* — NKL Law; Allen Xue

(57) ABSTRACT

Disclosed are a thioredoxin mutant, preparation method thereof, and application thereof in production of recombinant fusion protein. The thioredoxin mutant is prepared by modifying at least one amino acid in the amino acid sequence of SEQ ID NO: 1.

1 Claim, 5 Drawing Sheets

Specification includes a Sequence Listing.

THIOREDOXIN MUTANT, PREPARATION METHOD THEREOF, AND APPLICATION THEREOF IN PRODUCTION OF RECOMBINANT FUSION PROTEIN

INCORPORATION OF SEQUENCE LISTING

This application contains a sequence listing submitted in Computer Readable Form (CRF). The CFR file containing the sequence listing entitled "PA288.0091 ST25.txt", which was created on Dec. 22, 2021, and is 6,589 bytes in size. The information in the sequence listing is incorporated herein by reference in its entirety.

TECHNICAL FIELD

The present invention belongs to the field of biotechnology, and particularly relates to thioredoxin mutants (these mutations lead to changes in the thermal stability, solubility, and net charge characteristics of the thioredoxin mutants), to a method for preparation of the thioredoxin mutants, and to the use of the thioredoxin mutants in the production of recombinant fusion proteins.

BACKGROUND TECHNOLOGY

Many biologically active peptides and proteins have potential uses and commercial values in the fields of modern agriculture, biochemical industry, medicine and health, beauty care and food health and so on, but their applications are often restricted by industrial production conditions, such as variability under heat, organic solvents, and various chemical operating conditions. However, proteins that are stable under these conditions have been widely used in industrial production.

The three-dimensional structure of a protein is critical to its function. In fact, the diversity of protein function and structure depends entirely on the different three-dimensional conformations formed by the folding of different amino acid sequences. The research on the relationship between the three-dimensional structure of protein and its biological and structural properties is an important aspect in the development of protein chemistry.

The stability of folded proteins is determined by the interaction of different stable protein structures, such as the balance between hydrophobic and hydrophilic interactions, hydrogen bonds, secondary structure, etc., as well as the instability trend caused by changes in unfolding free energy. Therefore, by changing the interacting amino acids that affect the stability of the protein, the stability of the protein can be increased or decreased. However, the conformation and other changes may make the effect of amino acid substitution difficult to predict. In fact, it is also an important challenge in the field of protein engineering research.

Many peptides and proteins can be produced by recombinant methods in a variety of expression systems, such as various cells of bacteria, fungi, mammalian, plant, or insects. However, when bacteria are used as hosts for heterologous gene expression, the following difficulties and problems are usually encountered. First, it is difficult for heterologous genes encoding polypeptides to successfully express in bacteria. Because amino acid sequences are too short, most polypeptides are difficult to form a stable and soluble conformation when they are expressed heterologously, and are degraded by proteases and peptidases in host cells. The polypeptides that can be directly expressed in *E. coli* or other bacterial hosts usually exist in the form of insoluble or inclusion bodies, that make them unable to be directly used for biological activity screening, and bring difficulties to the extraction and purification of these polypeptides at the same time. Secondly, even if the produced polypeptides do not exist in the form of inclusion bodies, they may also have various structures due to their high degree of conformational freedom, and the biological activities of these structures will vary. Therefore, even if the primary structure of the polypeptide is the same, the activity level will be affected by the difference in its advanced structure. It is another difficulty encountered in heterologous expression of short peptides.

In addition, when proteins are heterologously expressed in bacterial cells, they are often produced in the form of inclusion bodies. These inclusion bodies usually need to be re-dissolved and renatured to restore the biological activity of the protein. But the effect of renaturation is uncertain due to the complexity of the renaturation process-. Moreover, the technology method of renaturation is usually difficult, the reagents are expensive, and the cost is too high for the production of recombinant proteins.

In order to solve the problems mentioned above, certain peptides or proteins have been used as fusion tags of target peptides or proteins in the art, so that the target heterologous polypeptides or proteins are recombinantly expressed in the form of fusion proteins in bacterial expression systems. The most common used fusion tags include elastin-like polypeptides (ELPs), maltose binding proteins (MBP), calmodulin binding proteins (CaMBPs), N-utilizing substance A (NusA), translation initiation factor IF2, glutathione-S-transferase (GST), peptidyl-prolyl cis-trans isomerase (PPIases), disulfide bond forming protein A (DsbA), and thioredoxin (Trx), etc.

However, even if the target peptide or protein produced by the fusion of these tag proteins is expressed in bacterial host cells in a soluble form, there still are other potential disadvantages in subsequent downstream production processes. These recombinant polypeptides or proteins successfully expressed in the cell enter the initial step of the downstream purification process, that is, the cell is disrupted and released. During industrial production, there are three types of cell disruption methods: one is physical cell destruction, mainly by cell freezing and thawing, freeze drying, and high-pressure homogenization. Except for the high-pressure homogenization method, which can be used for large-scale industrial production, the physical method is difficult to meet the needs of large-scale production. However, the equipment used in the high-pressure homogenization method is expensive, and the processing time is usually more than 10 h, which is not conducive to the production of recombinant polypeptides or proteins that are pressure-sensitive or protease-degradable. The second type is chemical cell disruption, in which the cells are disrupted or extracted mainly by using solvents and surfactants. This method not only uses a large amount of organic solvents, but also has a potential impact on the spatial configuration of recombinant polypeptides or proteins, which can easily lead to the loss of biological activity and cause the environmental problems. The third type is the biological cell disruption, in which some compound lysozymes are mainly used to break cell walls, however, it takes a long time to break cell walls by enzymatic lysis, and the cell disruption is generally incomplete. Moreover, the yield of recombinant peptides or proteins is low. Meanwhile, the addition of exogenous lysozyme makes the subsequent purification process become complicated, resulting in lower yield. In addition, it will also cause potential risks for the quality control of the product.

Therefore, by the cell disruption methods in the prior art, neither the release nor the extraction of recombinant polypeptides or proteins (referred to as recombinant fusion proteins) heterologously expressed by bacterial hosts can meet the industrial requirements of high-efficiency, low-cost, and large-scale production.

Content of the Invention

The technical problem to be solved by the present invention is to provide a thioredoxin mutant, aiming at the above-mentioned shortcomings in the prior art. The technical solution adopted by the present invention is: a thioredoxin mutant, which is an unnatural protein with solubility at high temperature.

The working principle or beneficial effects of the present invention are: the thioredoxin mutant can still maintain the solubility under long-term high temperature conditions; the thioredoxin mutant has both thermal stability and solubility in bacterial host cells, that is, the recombinant fusion protein produced by expression can be released quickly and rapidly extracted, as well as the reagents and the experimental equipment needed for extraction are low in price and can be used for large-scale industrial production. The recombinant fusion protein has good solubility and is not easily denatured under high temperature environment.

For further limitation, the thioredoxin mutant is artificially mutated based on the amino acid sequence of the model thioredoxin protein.

In the present invention, by the molecular modification of the natural thioredoxin, the soluble expression properties of the natural thioredoxin in the bacterial host are retained, and the properties of the stability and the solubility in the water phase are allowed to keep for a long time when the bacterial host fermentation broth is stirred at high temperature to break the cell walls. While the host cell protein, other impurity proteins and cell debris do not have long-term stability in the water phase at high temperature, and after a certain period of heat preservation treatment, they will gradually accumulate and precipitate. After subjecting to solid-liquid separation treatment, the separation and the extraction of the cell-broken suspension are carried out, and the thioredoxin mutant provided in the present invention will remain in the clear liquid with higher purity. Because thermal cell disruption does not require special equipment (usually being carried out in a fermentor), the cell lysis insulation time has nothing to do with the volume of the fermentation broth. Therefore, the thioredoxin mutant provided in the present invention can effectively meet the requirements of high-efficiency, low-cost, and large-scale production for recombinant polypeptides and proteins.

The present invention also provides a method for preparation of the thioredoxin mutant, including the following steps:

1) Using the coding gene of the model protein of thioredoxin as a template, random mutations on it are performed to obtain a gene mutation library encoding thioredoxin mutants;
2) The gene mutation library of the model protein of thioredoxin is cloned into an expression vector to obtain a recombinant expression vector, and then the expression vector is transformed into a suitable expression host, and a high expression level of the thioredoxin mutant expression library is screened out;
3) The thioredoxin mutant encoding gene in the thioredoxin mutant expression library is sequenced and analyzed, and the ΔΔG value and Δ net charge are calculated, then the thioredoxin mutant preferred library with a significant decrease in ΔΔG and an increase in Δ net charge is screened out;
4) The transformants of the preferred library of thioredoxin mutants are cultured to the logarithmic growth phase in a liquid medium containing antibiotics, and then the inducer is added to induce, and the culture is further incubated to the end point. Then, an equal volume of buffer is added to the culture medium and mixed well, followed by incubation at 70-100° C. in a water bath for a period of time. After sampling and centrifugation, the supernatant is analyzed by SDS-PAGE, and the thermal stability and the thermal solubility of the thioredoxin mutant are re-screened according to the optical density of the band;
5) The gene encoding the model protein of thioredoxin or one or more homologous genes are used to obtain the mutant gene of the thioredoxin mutant with improved heat-resistant and soluble properties, and optionally, steps 1) to 4) can be repeated once or several times;
6) The obtained thioredoxin mutant with improved heat-resistant and soluble properties is expressed.

The present invention further provides the use of the thioredoxin mutant in the production of recombinant fusion protein. There are two types of recombinant fusion protein, named as structure 1 and structure 2, respectively, wherein the structure of structure 1 is: thioredoxin mutant-linker peptide-cleavage site-target heterologous polypeptide or protein, while the structure of structure 2 is: thioredoxin mutant-cleavage site-target heterologous polypeptide or protein; the preparative method of structure 1 is: the target heterologous polypeptide or protein is combined with the cleavage site to obtain intermediate 1, and intermediate 1 is combined with the linker peptide to obtain intermediate 2, then intermediate 2 is combined with the amino terminus or the carboxyl terminus of the thioredoxin mutant to obtain the structure 1; the preparative method of structure 2 is: the target heterologous polypeptide or protein is combined with the cleavage site to obtain intermediate 1, and intermediate 1 is combined with the amino terminus or the carboxyl terminus of the thioredoxin mutant to obtain structure 2; the target heterologous polypeptide or protein is a polymer composed of less than 60 amino acids.

DESCRIPTION OF FIGURES

In FIG. 2, the rectangular boxes indicate the thioredoxin mutant bands, while M represents the protein Marker.

EXAMPLES

Figure 1:
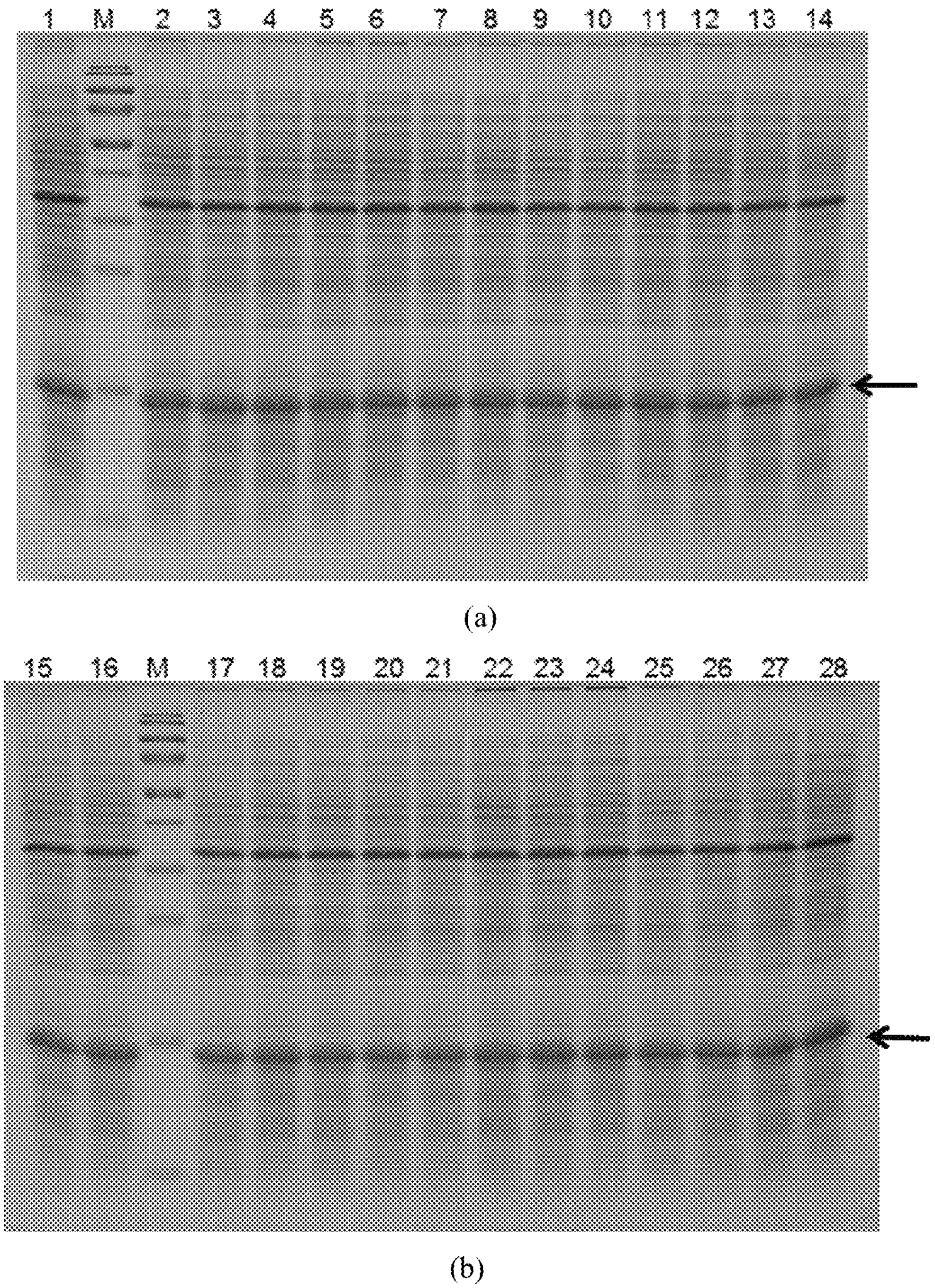
FIG. 1 shows the SD S-PAGE detection results of expression screening experiment for a part of the high-expression thioredoxin mutant, and the arrow in the figure indicates the thioredoxin mutant band, where the top number is the screening number for a part of thioredoxin mutants, and M is the protein Marker.

In the following, the present invention will be further elucidated combined with the examples, so that those skilled in the art can perform it by referring to the text of the description. It should be construed that the terms such as "having", "containing", and "including" used herein do not exclude the presence or addition of one or more other elements or combinations thereof.

In the description used herein, "several" means two or more, unless otherwise specifically defined. The term "ΔΔG" is defined herein as the difference in free energy of protein unfolding, whose calculation formula is: ΔΔG=ΔGTrxWT−ΔGmTrx, dimension kcal/mol, and this value reflects the difference in the stability of the wild-type protein and the mutant structure. The smaller value indicates that the mutant structure is more stable than the wild-type. The term "ΔGTrxWT" is defined herein as the unfolding free energy of the model protein molecule of thioredoxin, with the dimension kcal/mol. The term "ΔGmTrx" is defined herein as the free energy of unfolding of the thioredoxin mutant molecule, with the dimension kcal/mol. The term "Δnet charge" is defined herein as the difference in the net charge of protein molecules at pH8.0, whose calculation formula is: Δ net charge=net charge of TrxWT-net charge of mTrx, and this value reflects the charge difference between the wild-type protein structure and the mutant structure. The smaller value indicates that the mutant has a higher charge than the wild-type protein molecule. The term "net charge TrxWT" is defined herein as the net charge number of the model protein molecule of thioredoxin. The term "net charge mTrx" is defined herein as the net charge number of the mutant molecule of thioredoxin. The term "optical density" or "OD" is defined herein as the logarithm of the ratio of the incident light to the transmitted light for each protein band in the protein gel electrophoresis pattern recorded by projecting white light in the gel imaging system: OD=1 g (Incident light/transmitted light) or OD=1 g (1/transmittance), which is a dimensionless value. The term "linker peptide" is defined herein as a polypeptide sequence connecting the thioredoxin mutant and the cleavage site, specifically a sequence of amino acids between the C-terminus of the thioredoxin mutant and the N-terminus of the cleavage site. The term "cleavage site" is defined herein as a specific amino acid sequence recognized by an endoproteinase or a chemical reagent.

The present invention includes seven aspects. In the first aspect, the present invention provides a series of thioredoxin mutants (mTrx) for the fusion expression of polypeptides and proteins, which are mutants of soluble model proteins. Compared with the soluble model protein, the thioredoxin mutant provided in the present invention can maintain the solubility under long-term high temperature conditions.

In the context of the present invention, "thioredoxin mutant (mTrx)" denotes any protein that has a solubility at high temperature, but is not obtained from natural sources, whose amino acid sequence shows the certain difference from that of natural thioredoxins *Geobacillus stearothermophilus* and Bacillaceae and *Anoxybacillus tepidamans* and *Falsibacillus pallidus*.

The thioredoxin mutant provided in the present invention is obtained by artificial mutation based on the amino acid sequence of the model protein of thioredoxin, and the model protein of thioredoxin is derived from the thioredoxin of *Geobacillus stearothermophilus*, whose amino acid sequence is shown in SEQ ID NO:1. The thioredoxin mutant is preferably modified in at least one amino acid position in the following region of SEQ ID NO: 1: the amino acid sequence in group 1 consisting of positions 8, 10, 12, 13, 15, 17, 23, 29, 33, 36, 43, 44, 51, 56, 58, 71, 74, 82, 85, 91, 93, 94, and 102. The more preferred choice is that the thioredoxin mutant is modified in at least one amino acid position in the following region of SEQ ID NO: 1: the amino acid sequence in group 2 consisting of positions 12, 13, 15, 23, 29, 33, 43, 44, 51, 56, 58, 71, 74, 82, 85, 91, 93, and 102. Most preferably, the thioredoxin mutant is modified in at least one amino acid position in the following region of SEQ ID NO: 1: the amino acid sequence in group 3 consisting of positions 12, 15, 23, 44, 51, 56, 71, 85, 93, and 102.

The modification at the amino acid position includes the substitution with another amino acid selected from 20 natural amino acids in L configuration, as shown in Table 1. Alternatively, the modification at an amino acid position includes the deletion of the amino acid at the position. In addition, the modification at the amino acid position may include the substitution of one or more amino acids on the C-terminus or N-terminus of the amino acid.

TABLE 1

20 natural amino acids in L configuration

| Amino acid name | Three-letter abbreviation | One-letter abbreviation |
|---|---|---|
| Alanine | Ala | A |
| Arginine | Arg | R |
| Aspartic acid | Asp | D |
| Asparagine | Asn | N |
| Cysteine | Cys | C |
| Glutamine | Gln | Q |
| Glutamate | Glu | E |
| Glycine | Gly | G |
| Histidine | His | H |
| Isoleucine | Ile | I |
| Leucine | Leu | L |
| Lysine | Lys | K |
| Methionine | Met | M |
| Phenylalanine | Phe | F |
| Proline | Pro | P |
| Serine | Ser | S |
| Threonine | Thr | T |
| Tryptophan | Trp | W |
| Tyrosine | Tyr | Y |
| Valine | Val | V |

The model protein with the thioredoxin structure described in the present invention is selected from the group consisting of the following proteins: those having the thioredoxin structure, and preferably having the amino acid sequence of SEQ ID NO: 1 (i.e. the thioredoxin of *Geobacillus stearothermophilus*) or having the amino acid sequence of SEQ ID NO:2 (i.e. the thioredoxin of Bacillaceae strain) or having the amino acid sequence of SEQ ID NO:3 (i.e. the thioredoxin of *Anoxybacillus tepidamans* strain) or having the amino acid sequence of SEQ ID NO:4 (i.e. the thioredoxin of *Falsibacillus pallidus*).

The model protein is a protein having an amino acid sequence with at least 70%, preferably at least 75%, more preferably at least 80%, more preferably at least 85%, more preferably at least 90%, and most preferably at least 95% homology with SEQ ID NO:1, or an amino acid sequence having at least 70%, preferably at least 75%, more preferably at least 80%, more preferably at least 85%, more preferably at least 90%, and most preferably at least 95% homology with SEQ ID NO:2, or an amino acid sequence having at least 70%, preferably at least 75%, more preferably at least 80%, more preferably at least 85%, more preferably at least 90%, and most preferably at least 95% homology with SEQ ID NO: 3, or an amino acid sequence with at least 70%, preferably at least 75%, more preferably at least 80%, more preferably at least 85%, more preferably at least 90%, and most preferably at least 95% homology with SEQ ID NO: 4. As for the high temperature resistant and soluble model protein used in the present invention, it is more preferred for the protein to have a solubility at high temperature and have the amino acid sequence of SEQ ID NO: 1 or the amino acid sequence of SEQ ID NO: 2 or the amino acid sequence of SEQ ID NO:3 or the amino acid sequence of SEQ ID NO:4. As for a model protein with a solubility at high temperature, the thioredoxin of *Geobacillus stearothermophilus* (SEQ ID NO: 1) is the most preferred.

The present invention preferably provides the mutants selected from the following series of thioredoxin models, which has the protein structure consisting of TrxA with the amino acid sequence of SEQ ID NO: 1 and Trx with the amino acid sequence of SEQ ID NO: 2 and Trx with the amino acid sequence of SEQ ID NO: 3 and Trx with the amino acid sequence of SEQ ID NO: 4, together with the amino acid sequence having at least 70%, preferably at least 75%, more preferably at least 80%, more preferably at least 85%, more preferably at least 90%, most preferably at least 95% homology with that of SEQ ID NO: 1, or the amino acid sequence having at least 70%, preferably at least 75%, more preferably at least 80%, more preferably at least 85%, more preferably at least 90%, and most preferably at least 95% homology with that of SEQ ID NO: 2, as well as which is soluble at high temperature. Moreover, the mutant has been modified in at least the following sites:

one or more amino acid positions selected from the group consisting of 8, 10, 12, 13, 15, 17, 23, 29, 33, 36, 43, 44, 51, 56, 58, 71, 74, 82, 85, 91, 93, 94, and 102; one or more amino acid positions selected from the group consisting of 12, 13, 15, 23, 29, 33, 43, 44, 51, 56, 58, 71, 74, 82, 85, 91, 93, and 102; two or more amino acid positions selected from the group consisting of 12, 15, 23, 44, 51, 56, 71, 85, 93, and 102, and more preferably, the positions 15+51 or 23+51 or 85+93 or 15+93 or 23+93 or 51+102 or 15+102 or 15+23; three or more amino acid positions selected from the group consisting of 12, 13, 15, 23, 29, 33, 43, 44, 51, 56, 58, 71, 74, 82, 85, 91, 93, and 102, and more preferably, the positions 23+85+93 or 15+85+93 or 51+85+93 or 44+85+93 or 85+93+102 or 23+44+51 or 44+51+85; four or more amino acid positions selected from the group consisting of 12, 13, 15, 23, 29, 33, 43, 44, 51, 56, 58, 71, 74, 82, 85, 91, 93, and 102, and more preferably, the positions 23+51+85+93 or 15+51+85+93 or 15+23+85+93 or 23+44+51+85 or 44+51+85+93 or 23+44+85+93; five or more amino acid positions selected from the group consisting of 12, 13, 15, 23, 29, 33, 43, 44, 51, 56, 58, 71, 74, 82, 85, 91, 93, and 102, and more preferably, the positions 15+23+51+85+93 or 23+51+85+93+102 or 23+44+51+85+93 or 15+44+51+85+93 or 12+56+71+93+102 or 12+15+56+71+102; six or more amino acid positions selected from the group consisting of 12, 13, 15, 23, 29, 33, 43, 44, 51, 56, 58, 71, 74, 82, 85, 91, 93, and 102, and more preferably, the positions 15+23+29+44+51+85 or 15+23+44+51+85+93 or 12+23+56+71+93+102 or 12+56+71+85+93+102 or 15+23+44+51+85+93 or 23+44+51+85+93+102; seven or more amino acid positions selected from the group consisting of 12, 13, 15, 23, 29, 33, 43, 44, 51, 56, 58, 71, 74, 82, 85, 91, 93, and 102, and more preferably, the positions 15+23+44+51+85+93+102 or 15+23+44+51+71+85+93 or 15+23+44+51+74+85+93 or 12+15+23+44+51+85+93 or 15+23+43+44+51+85+93; eight or more amino acid positions selected from the group consisting of 12, 13, 15, 23, 29, 33, 43, 44, 51, 56, 58, 71, 74, 82, 85, 91, 93, and 102, and more preferably, the positions 12+15+23+44+51+85+93+102 or 15+23+44+51+56+85+93+102 or 15+23+44+51+71+85+93+102 or 15+23+29+44+51+85+93+102 or 12+15+23+44+51+56+85+93 or 15+23+29+44+51+56+71+85; nine or more amino acid positions selected from the group consisting of 12, 13, 15, 23, 29, 33, 43, 44, 51, 56, 58, 71, 74, 82, 85, 91, 93, and 102, and more preferably, the positions 12+15+23+44+51+56+71+85+93 or 15+23+43+44+51+74+85+91+93 or 15+23+29+44+51+71+85+93+102 or 15+23+44+51+56+71+85+93+102 or 12+15+23+44+51+71+85+93+102; ten or more amino acid positions selected from the group consisting of 12, 13, 15, 23, 29, 33, 43, 44, 51, 56, 58, 71, 74, 82, 85, 91, 93, and 102, and more preferably, the positions 12+15+23+29+44+51+56+71+85+93 or 15+23+43+44+51+71+74+85+91+93 or 15+23+43+44+51+74+85+91+93+102 or 12+15+23+44+51+56+71+85+93+102; eleven amino acid positions selected from the group consisting of 12, 13, 15, 23, 29, 33, 43, 44, 51, 56, 58, 71, 74, 82, 85, 91, 93, and 102, and more preferably, the positions 12+15+23+44+51+56+71+85+91+93+102 or 12+15+23+29+44+51+56+71+85+93+102 or 12+15+23+44+51+56+71+74+85+93+102 or 12+15+23+43+44+51+56+71+85+93+102; twelve amino acid positions selected from the group consisting of 12, 13, 15, 23, 29, 33, 43, 44, 51, 56, 58, 71, 74, 82, 85, 91, 93, and 102, and more preferably, the positions 12+15+23+29+44+51+56+71+85+91+93+102 or 12+15+23+44+51+56+71+74+85+91+93+102 or 12+15+23+43+44+51+56+71+85+91+93+102 or 12+15+23+43+44+51+56+71+74+85+93+102; thirteen amino acid positions selected from the group consisting of 12, 13, 15, 23, 29, 33, 43, 44, 51, 56, 58, 71, 74, 82, 85, 91, 93, and 102, and more preferably, the positions 12+15+23+29+44+51+56+71+74+85+91+93+102 or 12+15+23+43+44+51+56+71+74+85+91+93+102 or 12+15+23+44+51+56+71+74+82+85+91+93+102 or 12+15+23+44+51+56+58+71+74+85+91+93+102; fourteen amino acid positions selected from the group consisting of 12, 13, 15, 23, 29, 33, 43, 44, 51, 56, 58, 71, 74, 82, 85, 91, 93, and 102, and more preferably, the positions 12+15+23+43+44+51+56+71+74+82+85+91+93+102 or 12+15+23+29+43+44+51+56+71+74+85+91+93+102 or 12+13+15+23+43+44+51+56+71+74+85+91+93+102 or 12+15+23+33+43+44+51+56+71+74+85+91+93+102 or 12+15+23+43+44+51+56+58+71+74+85+91+93+102; fifteen amino acid positions selected from the group consisting of 12, 13, 15, 23, 29, 33, 43, 44, 51, 56, 58, 71, 74, 82, 85, 91, 93, and 102, and more preferably, the positions 12+13+15+23+29+43+44+51+56+71+74+85+91+93+102 or 12+13+15+23+33+43+44+51+56+71+74+85+91+93+102 or 12+15+23+43+44+51+56+58+71+74+82+85+91+93+102; sixteen amino acid positions selected from the group consisting of 12, 13, 15, 23, 29, 33, 43, 44, 51, 56, 58, 71, 74, 82, 85, 91, 93, and 102, and more preferably, the positions 12+13+15+23+29+43+44+51+56+58+71+74+85+

91+93+102 or 12+13+15+23+33+43+44+51+56+58+71+74+85+91+93+102 or 12+15+23+33+43+44+51+56+58+71+74+82+85+91+93+102; seventeen amino acid positions selected from the group consisting of 12, 13, 15, 23, 29, 33, 43, 44, 51, 56, 58, 71, 74, 82, 85, 91, 93, and 102, and more preferably, the positions 12+13+15+23+33+43+44+51+56+58+71+74+82+85+91+93+102 or 12+13+15+23+29+33+43+44+51+56+58+71+74+85+91+93+102 or 12+13+15+23+29+43+44+51+56+58+71+74+82+85+91+93+102; eighteen amino acid positions selected from the group consisting of 12, 13, 15, 23, 29, 33, 43, 44, 51, 56, 58, 71, 74, 82, 85, 91, 93, and 102.

The present invention also provides the thioredoxin mutant defined above, which is a mutant of the thioredoxin of *Geobacillus stearothermophilus*, and the thioredoxin mutant is modified at a position selected from the following amino acid positions: the group consisting of positions D8, T10, A12, A13, T15, D17, D23, C29, R33, A36, D43, R44, K51, N56, D58, S71, T74, Q82, D85, Q91, K93, E94 and K102, where the letter before the number represents the corresponding amino acid (the single-letter abbreviation), and the number is the amino acid position in the amino acid sequence of the thioredoxin of *Geobacillus stearothermophilus* described in SEQ ID NO:1.

Preferred thioredoxin mutants are the mutants of thioredoxin of *Geobacillus stearothermophilus* with modifications at least at the following positions:

one or more amino acid positions selected from the group consisting of D8, T10, A12, A13, T15, D17, D23, C29, R33, A36, D43, R44, K51, N56, D58, S71, T74, Q82, D85, Q91, K93, E94 and K102; one or more amino acid positions selected from the group consisting of A12, A13, T15, D23, C29, R33, D43, R44, K51, N56, D58, S71, T74, Q82, D85, Q91, K93, and K102; one or more amino acid positions selected from the group consisting of A12, T15, D23, R44, K51, N56, S71, D85, K93, and K102; two or more amino acid positions selected from the group consisting of A12, T15, D23, R44, K51, N56, S71, D85, K93, and K102; three or more amino acid positions selected from the group consisting of A12, A13, T15, D23, C29, R33, D43, R44, K51, N56, D58, S71, T74, Q82, D85, Q91, K93, and K102; four or more amino acid positions selected from the group consisting of A12, A13, T15, D23, C29, R33, D43, R44, K51, N56, D58, S71, T74, Q82, D85, Q91, K93, and K102; five or more amino acid positions selected from the group consisting of A12, A13, T15, D23, C29, R33, D43, R44, K51, N56, D58, S71, T74, Q82, D85, Q91, K93, and K102; six or more amino acid positions selected from the group consisting of A12, A13, T15, D23, C29, R33, D43, R44, K51, N56, D58, S71, T74, Q82, D85, Q91, K93, and K102; seven or more amino acid positions selected from the group consisting of A12, A13, T15, D23, C29, R33, D43, R44, K51, N56, D58, S71, T74, Q82, D85, Q91, K93, and K102; eight or more amino acid positions selected from the group consisting of A12, A13, T15, D23, C29, R33, D43, R44, K51, N56, D58, S71, T74, Q82, D85, Q91, K93, and K102; nine or more amino acid positions selected from the group consisting of A12, A13, T15, D23, C29, R33, D43, R44, K51, N56, D58, S71, T74, Q82, D85, Q91, K93, and K102; ten or more amino acid positions selected from the group consisting of A12, A13, T15, D23, C29, R33, D43, R44, K51, N56, D58, S71, T74, Q82, D85, Q91, K93, and K102; eleven amino acid positions selected from the group consisting of A12, A13, T15, D23, C29, R33, D43, R44, K51, N56, D58, S71, T74, Q82, D85, Q91, K93, and K102; twelve amino acid positions selected from the group consisting of A12, A13, T15, D23, C29, R33, D43, R44, K51, N56, D58, S71, T74, Q82, D85, Q91, K93, and K102; thirteen amino acid positions selected from the group consisting of A12, A13, T15, D23, C29, R33, D43, R44, K51, N56, D58, S71, T74, Q82, D85, Q91, K93, and K102; fourteen amino acid positions selected from the group consisting of A12, A13, T15, D23, C29, R33, D43, R44, K51, N56, D58, S71, T74, Q82, D85, Q91, K93, and K102; fifteen amino acid positions selected from the group consisting of A12, A13, T15, D23, C29, R33, D43, R44, K51, N56, D58, S71, T74, Q82, D85, Q91, K93, and K102; sixteen amino acid positions selected from the group consisting of A12, A13, T15, D23, C29, R33, D43, R44, K51, N56, D58, S71, T74, Q82, D85, Q91, K93, and K102; seventeen amino acid positions selected from the group consisting of A12, A13, T15, D23, C29, R33, D43, R44, K51, N56, D58, S71, T74, Q82, D85, Q91, K93, and K102; eighteen amino acid positions selected from the group consisting of A12, A13, T15, D23, C29, R33, D43, R44, K51, N56, D58, S71, T74, Q82, D85, Q91, K93, and K102.

The preferred modification of each position in the thioredoxin of *Geobacillus stearothermophilus* is as follows (using the one-letter abbreviation code of amino acid):

D at position 8 of SEQ ID NO: 1 is substituted with Q, E, A, K, R, S or T, more preferably with Q, E, A, or K, and most preferably with A. T at position 10 of SEQ ID NO: 1 is substituted with D, E, Q, K, R, S, or I, more preferably with D, I, or Q, and most preferably with I. A at position 12 of SEQ ID NO: 1 is substituted with G, E, Q, K, R, S, or I, more preferably with G or I, and most preferably with I. A at position 13 of SEQ ID NO: 1 is substituted with D, E, Q, K, R, S or I, more preferably with I or Q, and most preferably with I. T at position 15 of SEQ ID NO: 1 is substituted with I, V, A, T or deleted, more preferably with I or Q, and most preferably with I. D at position 17 of SEQ ID NO: 1 is substituted with N, E, Q, K, R, S, G or A, more preferably with E or Q, and most preferably with E. D at position 23 of SEQ ID NO: 1 is substituted with T, Q, K, R, S, G or N, more preferably with S or T, most preferably with T. C at position 29 of SEQ ID NO: 1 is substituted with R, D, S, T, N, K, W or deleted, more preferably substituted with R, S, K, W or deleted, most preferably substituted with S and deleted. Rat position 33 of SEQ ID NO: 1 is substituted with D, E, Q, K, N or R, more preferably with K, Q or N, and most preferably with K. A at position 36 of SEQ ID NO: 1 is substituted with G, S, T, K, R, H, L or deleted, more preferably substituted with L, S, K or deleted, most preferably deleted. D at position 43 of SEQ ID NO: 1 is substituted with Q, Y, W, P, I or E, more preferably with Q or E, and most preferably with E. R at position 44 of SEQ ID NO: 1 is substituted with L, A, Q, S, T, K, or H, more preferably with L, A, or Q, and most preferably with Q. K at position 51 of SEQ ID NO: 1 is substituted with Q, D, R, E or I, more preferably with Q or R, most preferably with K51R. N at position 56 of SEQ ID NO: 1 is substituted with E, Q, R, K, W or Y, more preferably with K, R or Q, and most preferably with K. D at position 58 of SEQ ID NO: 1 is substituted with W, R, T, D, Q, H, or E, more preferably with R, Q, or E, and most preferably with E. S at position 71 of SEQ ID NO: 1 is substituted with I, L, K, D, M, E, or N, more preferably with I, L, or M, and most preferably with M. T at position 74 of SEQ ID NO: 1 is substituted with I, L, D, S, M or V, more preferably with I or M, and most preferably with I. E at position 82 of SEQ ID NO: 1 is substituted with Q, N, R, or K, more preferably with K, N, or R, and most preferably with K. D at position 85 of SEQ ID NO: 1 is substituted with R, Q, H, N, E, or K, more preferably with E, Q, or K, and most preferably with E. Q at position 91 of SEQ ID NO: 1 is substituted with E, Y, I, N or R, more preferably with R or K, and most preferably with K. K at position 93 of SEQ ID NO: 1 is substituted with P, M, S, I, Q, or N, more preferably with P or M, and most preferably with P. E at position 94 of SEQ ID NO: 1 is substituted with D, S, E, Q, N, K or R, more preferably with D, S, E, or Q, and most preferably with E94Q. K at position 102 of SEQ ID NO: 1 is substituted with D, S, E, H, Y, K, or R, more preferably with H, Y, or S, and most preferably with H.

Highly preferred thioredoxin mutants are shown in Table 2. Each mutant is identified by its number: the mutation was introduced into the thioredoxin from *Geobacillus stearothermophilus* (SEQ ID NO: 1). According to the calculation method of ΔΔG and Δnet charge in Example 3, the ΔG and net charge of thioredoxin from *Geobacillus stearothermophilus* (SEQ ID NO: 1) were used as model controls.

Compared with the heat-resistant model protein of thioredoxin, the thioredoxin mutant provided in the present invention has a less ΔΔG or a greater Δnet charge, which is more conducive to the downstream purification process developed based on high temperature and charge properties. The ΔΔG of thioredoxin mutant is reduced by at least −1 kcal/mol, more preferably at least −2 kcal/mol, more preferably at least −3 kcal/mol, more preferably at least −4 kcal/mol, more preferably at least −5 kcal/mol, more preferably at least −6 kcal/mol, more preferably at least −7 kcal/mol, more preferably at least −8 kcal/mol, more preferably at least −9 kcal/mol, more preferably at least −10 kcal/mol, more preferably at least −11 kcal/mol, more preferably at least −12 kcal/mol, and more preferably at least −13 kcal/mol. The Δnet charge of thioredoxin mutant is increased by at least −0.8, more preferably at least −1, more preferably at least −2, and more preferably at least −3. The thioredoxin mutant that is more stable under high temperature environments and has a greater net charge is more conducive to the application in the production method of the target heterologous polypeptide or protein, and the detailed method will be further described below. Most valuably, the thioredoxin mutant provided in the present invention has both thermal stability and soluble expression in bacterial host cells, as well as the soluble stability under high temperature environments.

In the second aspect, the present invention provides polynucleotides encoding the thioredoxin mutants of the present invention. The polynucleotide encoding the thioredoxin mutant of the present invention can be any polynucleotide encoding a suitable amino acid sequence of the present invention. Alternatively, the polynucleotide of the present invention may include a coding sequence in which the codon usage of multiple amino acids is different from the codon usage in *Geobacillus stearothermophilus*. For example, the codons can be optimized to suit the codon preference requirements of specific host cells, and used for the transformation of DNA fragments encoding thioredoxin mutants.

In the third aspect, the present invention provides an expression vector containing the polynucleotide described above.

In the fourth aspect, the present invention provides transformed host cells that are transformed with the polynucleotide of the present invention or the expression vector of the present invention. The transformed host cell can be used to produce the thioredoxin mutant of the present invention, or the host cell can be used to produce a heterologous polypeptide or protein of interest.

The host cell used to produce the thioredoxin mutant of the present invention is preferably a host cell known in the art, in that it can efficiently produce polypeptides or proteins outside or in the cell, for example microorganisms such as fungi, yeasts, and bacteria. Examples of preferred host cells include, but are not limited to, the following genera: *Saccharomyces* (such as *S. cerevisiae*), *Pichia* (such as *P. pastoris*), *Bacillus* (such as *B. subtilis, B. licheniformis*), and *Escherichia* (such as *E. coli*).

In the fifth aspect, the present invention provides a recombinant fusion protein using the thioredoxin mutant and a target heterologous polypeptide or protein mentioned above, whose structure is: (1) thioredoxin mutant-connecting peptide-cleavage site-target heterologous polypeptide or protein or (2) thioredoxin mutant-cleavage site-target heterologous polypeptide or protein. The target heterologous polypeptide or protein is combined with the connecting peptide and/or the cleavage site and then fused to the amino terminal or carboxy terminal of the thioredoxin mutant provided in the present invention. The connecting peptide includes a flexible connecting peptide or a rigid connecting peptide or no connecting peptide, and the cleavage site includes, but is not limited to, an endoproteinase cleavage site or a chemical cleavage site.

The linker peptides of the present invention are preferably the following flexible connecting peptides or rigid connecting peptides. The functions of the connecting peptides in the production of recombinant fusion proteins are well known in the art. Examples of preferred flexible connecting peptides include, but are not limited to the following categories (the single-letter abbreviations of amino acids): (GGGGS)n (n≤6), GSAGSAAGSGEF, GGSSG, GSG and (G)n (n≤8); examples of preferred rigid connecting peptides include, but are not limited to the following categories (the single-letter abbreviations of amino acids): (EAAAK)n(n≤6), (XP)n (X can be designed as any amino acid, n≤18), (PT)nP(n≤18) and A(EAAAK)4ALEA(EAAAK)4A.

The site included in the cleavage site of the present invention is preferably the following endoproteinase cleavage site or chemical cleavage site, that can be effectively recognized and specifically cleaved by the corresponding endoproteinases or chemical reagents, and are well known in the art. Examples of preferred endoproteinases and chemical reagents include, but are not limited to the following categories: thrombin, tobacco etch virus protease, 3C protease, V8 protease, enterokinase, trypsin, and lysyl endopeptidase. The chemical reagents are cyanogen bromide, hydroxylamine, and formic acid.

In the sixth aspect, the present invention provides the use of the recombinant fusion protein with structure mentioned above: (1) thioredoxin mutant-connecting peptide-cleavage site-target heterologous polypeptide or protein; (2) thioredoxin mutant-cleavage site-target heterologous polypeptide or protein, as well as the method for producing target heterologous polypeptides and proteins. The method includes culturing the transformed host cell of the present invention under conditions conducive to the production of the above-mentioned recombinant fusion protein, and recovering the above-mentioned recombinant fusion protein after the culture is completed. The preferred heterologous polypeptide or protein of interest in the recombinant fusion protein mentioned above means a polymer composed of 60 or less amino acids, and the examples include, but are not limited to, the following types: glucagon-like peptide-1 (GLP-1) and the similar polymers (such as GLP-1 (7-37), GLP-1 (9-37), GLP-1 (7-36), GLP-1 (11-37), $Arg^{34}$GLP-1 (7-37), $Arg^{34}$GLP-1 (9-37)); parathyroid hormone (PTH) and the similar polymers (such as hPTH) (1-34)); glucagon-like peptide-2 (GLP-2) and the similar polymers (such as GLP-2 (1-33), Lys17Arg30GLP-2 (1-33); Adrenocorticotropic hormone (ACTH) and the similar polymers; Melanocyte-stimulating hormones (MSH) and the similar polymers; Adrenomedullin ADM and the similar polymers; Atrial natriuretic peptide (ANP) and the similar polymers; Oxytocin (Oxt) and the similar polymers; Growth hormone-releasing hormone (GHRH) and the similar polymers; Vasoactive intestinal peptide (VIP) and the similar polymers; Uroguanylin and the similar polymers. In a preferred embodiment, the present invention provides a method for producing a target heterologous polypeptide or protein $Arg^{34}$GLP-1 (9-37) by culturing a host strain of *Escherichia coli*, which has been transformed with a selected polynucleotide encoding a thioredoxin mutant of the present invention. Highly preferred thioredoxin mutants are selected from the group in Table 2.

In the seventh aspect, the present invention provides a method for obtaining the thioredoxin mutant of the present invention, wherein the method includes the following steps:

Using the coding gene of the model protein of thioredoxin as a template, random mutations on it are performed to obtain a gene mutation library encoding thioredoxin mutants;

The gene mutation library of the model protein of thioredoxin is cloned into an expression vector to obtain a recombinant expression vector, and then the expression vector is transformed into a suitable expression host, and a high expression level of the thioredoxin mutant expression library is screened out;

The thioredoxin mutant encoding gene in the thioredoxin mutant expression library is sequenced and analyzed, and using the algorithm software in the art, such as Foldx, Rosetta ΔΔG, BindProfX, PROTEIN CALCULATOR v3.4, etc., ΔΔG value and Δnet charge are calculated, then the thioredoxin mutant preferred library with a significant decrease in ΔΔG and an increase in Δ net charge is screened out;

The transformants of the preferred library of thioredoxin mutants screened out above are cultured to the logarithmic growth phase in a liquid medium containing antibiotics, then the inducer is added to induction, and the cultivation lasts to the end. Then, an equal volume of buffer is added to the culture medium and mixed, followed by incubation at 70-100° C. in a water bath for a period of time. After sampling and centrifugation, the supernatant is analyzed by SDS-PAGE, and the thermal stability and the thermal solubility of the thioredoxin mutant are re-screened according to the optical density of the band;

The gene encoding the model protein of thioredoxin or one or more homologous genes are used to obtain the mutant gene of the thioredoxin mutant with improved heat-resistant and soluble properties, and optionally, steps 1 to 4 can be repeated once or several times;

According to methods known in the art, the obtained thioredoxin mutant with improved heat-resistant and soluble properties is expressed.

The preferred model protein of thioredoxin is selected from the group consisting of the following proteins: the thioredoxin from *Geobacillus stearothermophilu*, which preferably has the amino acid sequence of SEQ ID NO: 1, and more preferably at least 70%, more preferably at least 75%, more preferably at least 80%, more preferably at least 85%, more preferably at least 90%, most preferably at least 95% homology, such as the thioredoxin summarized in Table 2.

The above-mentioned steps 1-6 can be performed by the well-known ways in molecular biology. Any gene mutation method in molecular biology can be used to carry out the coding gene mutation, and the more suitable methods are Error-prone PCR and DNA Shuffling.

Example 1

Step 1) Establishment of Thioredoxin Mutant Gene Library

The amino acid sequence (SEQ ID NO:1) of thioredoxin from *Geobacillus stearothermophilu* was optimized according to *E. coli* codon usage bias and synthesized by General Biosystems (Anhui) Co., Ltd. The gene was named TrxWT and inserted into the multiple cloning site of the vector pET28a, to obtain the recombinant vector pET28a-TrxWT. The primers were designed, and the thioredoxin TrxWT gene was used as a template to perform error-prone PCR amplification, then the mixture of obtained random mutant fragments was inserted into the vector pET28a to obtain the recombinant vector pET28a-TrxWT_epmut mix containing the mutant gene. The recombinant vector mixture was transferred into competent cells *E. coli* BL21 (DE3) to obtain an expression library with a library capacity of about 11000-12000. Fifty single colonies were randomly selected for double enzyme digestion verification, and the results showed that about 25% were false-positive transformants. Subsequently, 15 strains of positive transformants were randomly selected for sequencing analysis to determine the mutation rate.

Step 2) Establishment of Expression Library of Highly Expressing Thioredoxin Mutant The obtained positive transformants from the thioredoxin mutant *E. coli* expression library were inoculated into a 96-deep-well plate containing LB liquid medium with 50 μg/mL kanamycin sulfate, and cultured overnight at 37° C., 700 rpm. The obtained culture broth was used as a seed, inoculated at 1% inoculum into the fresh LB liquid medium containing 50 μg/mL kanamycin sulfate, and cultured in a 96-deep-well plate at 37° C. and 700 rpm for 4-6 h. The temperature was adjusted to 30° C., and then IPTG was added to a final concentration of 0.4 mM. The culture was further incubated for 20-25 h under shaking condition. The obtained culture broth was centrifuged at 4000 rpm for 10 min at room temperature, and the cell pellets were collected and stored at −20° C. A certain volume of sample loading buffer was added to the cell pellets, and the mixture was boiled at 100° C. for 5 min for the sample preparation. The optical density value of the target protein band was analyzed by SDS-PAGE, and part of the screening results are shown in FIGS. 1(*a*) and (*b*). The results in the Figure showed that the thioredoxin mutant had normal expression.

Step 3) Establishment of the Preferred Library of Thioredoxin Mutants

Several positive transformants obtained from the expression library of highly expressing thioredoxin mutants were randomly selected for sequencing and analysis. According to the sequencing results, the algorithm softwares (such as Foldx, Rosetta ΔΔG, BindProfX, PROTEIN CALCULATOR v3. 4, etc.) known in the art were used to calculate the ΔΔG value and Δ net charge between each thioredoxin mutant and the template thioredoxin according to the following formula, using the ΔG and net charge of the template thioredoxin (SEQ ID NO: 1) from *Geobacillus stearothermophilus* as controls. Some of the calculation results are shown in Table 2. From the results in Table 2, it could be seen that both ΔΔG and Δnet charge of the thioredoxin mutants obtained by the screening were improved compared to the template thioredoxin from the natural source, where the smaller ΔΔG value indicated the stability of the thioredoxin mutant was better, while the smaller Δnet charge value suggested the polarity of the thioredoxin mutant was stronger.

ΔΔG=ΔGTrxWT−ΔGmTrx;

Δnet charge=net charge TrxWT−net charge mTrx;

TABLE 2

Thioredoxin mutants and their ΔΔG and Δ net charges

| | | Stability and net charge performance | |
|---|---|---|---|
| Mutant No. | Mutation site | ΔΔG (kcal/mol) | Δnet charge |
| mTrx 1 | D23T + K93P | −5.34 | −1.0 |
| mTrx 2 | T15I + D23T + C29S + R44Q + K51R + D85E + K93P | −7.87 | −1.8 |
| mTrx 3 | K93P | −2.87 | −2.0 |
| mTrx 4 | D23T + R44Q + K51R + D85E + K93P | −8.24 | −2.0 |
| mTrx 5 | T15I + D23T + R44Q | −4.22 | −1.0 |
| mTrx 6 | T15I + K93P | −4.57 | −2.0 |
| mTrx 7 | T15I + D23T + R44Q + K51R + D85E + K93P | −8.87 | −2.0 |
| mTrx 8 | T15I + D23T + R44Q + K51R + D85E + Q91K + K93P | −9.52 | −1.0 |
| mTrx 9 | R44Q + K51R + D85E + K93P | −6.47 | −3.0 |
| mTrx 10 | D85E + K93P | −5.16 | −2.0 |
| mTrx 11 | D23T + K51R + K93P | −5.37 | −1.0 |
| mTrx 12 | C29S + K93P | −1.87 | −1.8 |
| mTrx 13 | D23T + R44Q + K51R | −5.85 | −1.0 |
| mTrx 14 | T15I + D23T + R44Q + K51R + D85E + K93P + K102H | −9.56 | −3.0 |
| mTrx 15 | T15I + D23T + R44Q + K51R + T74I + D85E + K93P | −9.56 | −2.0 |
| mTrx 16 | T15I + D23T + D43E + R44Q + K51R + D85E + K93P | −9.43 | −2.0 |
| mTrx 17 | T15I + D23T + R44Q + K51R + N56K + D85E + K93P | −9.56 | −1.0 |
| mTrx 18 | T15I + D23T + C29S + R44Q + K51R + D85E | −9.58 | −0.8 |
| mTrx 19 | T15I + D23T + R44Q + K51R | −6.06 | −1.0 |
| mTrx 20 | D23T + R44Q + K51R + D85E | −6.49 | −1.0 |
| mTrx 21 | T15I + D23T + R44Q + K51R + N56K + D85E + K93P + K102H | −10.34 | −2.0 |
| mTrx 22 | D23T + K51R + D85E + K93P + K102H | −9.17 | −2.0 |
| mTrx 23 | T15I + D23T + D43E + R44Q + K51R + T74I + D85E + Q91K + K93P | −11.26 | −1.0 |
| mTrx 24 | K51R + D85E + K93P | −6.82 | −2.0 |
| mTrx 25 | T15I + D23T + R44Q + K51R + D85E | −7.19 | −1.0 |
| mTrx 26 | R44Q + K51R + D85E | −4.62 | −2.0 |
| mTrx 27 | T15I + D23T + R44Q + K51R + D85E + K93M | −7.16 | −2.0 |
| mTrx 28 | T15I + D23T + D43E + R44Q + K51R + T74I + D85E + Q91K + K93P + K102H | −11.72 | −2.0 |
| mTrx 29 | T15I + D23T + C29S + R44Q + K51R + S71M + D85E + K93P + K102H | −9.61 | −2.7 |
| mTrx 30 | T15I + K51R + D85E + K93P | −7.62 | −2.0 |
| mTrx 31 | A12I + T15I + D23T + R44Q + K51R + D85E + K93P | −9.62 | −2.0 |
| mTrx 32 | T15I + D23T + R44Q + K51R + S71M + D85E + K93P | −9.92 | −2.0 |
| mTrx 33 | D43E + T74I + Q91K | −2.67 | −0.1 |
| mTrx 34 | A12I + T15I + D23T + R44Q + K51R + D85E + K93P + K102H | −10.28 | −3.0 |
| mTrx 35 | T15I + D23T + R44Q + K51R + S71M + D85E + K93P + K102H | −10.48 | −3.0 |
| mTrx 36 | A12I + T15I + D23T + R44Q + K51R + N56K + D85E + K93P | −10.27 | −1.0 |
| mTrx 37 | T15I + D23T + C29S + R44Q + K51R + N56K + S71M + D85E | −10.61 | −1.0 |
| mTrx 38 | T15I + D23T + R44Q + K51R + N56K + S71M + D85E + K93P + K102H | −11.02 | −2.0 |
| mTrx 39 | T15I + D23T + D43E + R44Q + K51R + S71M + T74I + D85E + Q91K + K93P | −12.40 | −1.0 |
| mTrx 40 | A12I + D23T + N56K + S71M + K93P + K102H | −8.24 | −1.0 |
| mTrx 41 | A12I + T15I + D23T + C29S + R44Q + K51R + N56K + S71M + D85E + K93P | −10.23 | −0.8 |
| mTrx 42 | A12I + T15I + D23T + C29S + R44Q + K51R + N56K + S71M + D85E + K93P + K102H | −7.74 | −1.8 |
| mTrx 43 | A12I + T15I + D23T + C29S + R44Q + K51R + N56K + S71M + D85E + Q91K + K93P + K102H | −8.00 | −0.8 |
| mTrx 44 | A12I + T15I + D23T + R44Q + K51R + S71M + D85E + K93P + K102H | −11.23 | −3.0 |
| mTrx 45 | A12I + N56K + S71M + K93P + K102H | −6.07 | −2.0 |
| mTrx 46 | A12I + T15I + D23T + R44Q + K51R + N56K + S71M + D85E + K93P | −11.13 | −1.0 |
| mTrx 47 | A12I + T15I + D23T + C29S + R44Q + K51R + N56K + S71M + T74I + D85E + Q91K + K93P + K102H | −8.41 | −0.8 |
| mTrx 48 | A12I + T15I + D23T + R44Q + K51R + N56K + S71M + D85E + K93P + K102H | −11.85 | −2.0 |

TABLE 2-continued

Thioredoxin mutants and their ΔΔG and Δ net charges

| Mutant No. | Mutation site | Stability and net charge performance ΔΔG (kcal/mol) | Δnet charge |
|---|---|---|---|
| mTrx 49 | A12I + T15I + D23T + R44Q + K51R + N56K + S71M + D85E + Q91K + K93P + K102H | −8.40 | −1.0 |
| mTrx 50 | A12I + N56K + S71M + D85E + K93P + K102H | −7.55 | −2.0 |
| mTrx 51 | A12I + C29S + N56K + S71M + K102H | −2.22 | −0.8 |
| mTrx 52 | A12I + T15I + D23T + C29S + D43E + R44Q + K51R + N56K + S71M + T74I + D85E + Q91K + K93P + K102H | −8.95 | −0.8 |
| mTrx 53 | A12I + T15I + D23T + R44Q + K51R + N56K + S71M + T74I + D85E + K93P + K102H | −8.16 | −2.0 |
| mTrx 54 | A12I + T15I + D23T + R44Q + K51R + N56K + S71M + T74I + D85E + Q91K + K93P + K102H | −8.79 | −1.0 |
| mTrx 55 | A12I + T15I + D23T + D43E + R44Q + K51R + N56K + S71M + D85E + K93P + K102H | −8.29 | −2.0 |
| mTrx 56 | A12I + T15I + D23T + D43E + R44Q + K51R + N56K + S71M + D85E + Q91K + K93P + K102H | −8.94 | −1.0 |
| mTrx 57 | A12I + T15I + D23T + D43E + R44Q + K51R + N56K + S71M + T74I + Q82K + D85E + Q91K + K93P + K102H | −9.84 | 1.0 |
| mTrx 58 | A12I + T15I + D23T + D43E + R44Q + K51R + N56K + S71M + T74I + D85E + K93P + K102H | −8.70 | −2.0 |
| mTrx 59 | A12I + T15I + D23T + D43E + R44Q + K51R + N56K + S71M + T74I + D85E + Q91K + K93P + K102H | −9.34 | −1.0 |
| mTrx 60 | A12I + T15I + N56K + S71M + K102H | −4.77 | −1.0 |
| mTrx 61 | A12I + A13I + T15I + D23T + C29S + R33K + D43E + R44Q + K51R + N56K + D58E + S71M + T74I + Q82K + D85E + Q91K + K93P + K102H | −10.14 | 1.2 |
| mTrx 62 | A12I + A13I + T15I + D23T + C29S + R33K + D43E + R44Q + K51R + N56K + D58E + S71M + T74I + D85E + Q91K + K93P + K102H | −9.73 | −0.8 |
| mTrx 63 | A12I + A13I + T15I + D23T + R33K + D43E + R44Q + K51R + N56K + S71M + T74I + D85E + Q91K + K93P + K102H | −9.53 | −1.0 |
| mTrx 64 | A12I + A13I + T15I + D23T + C29S + D43E + R44Q + K51R + N56K + S71M + T74I + D85E + Q91K + K93P + K102H | −9.14 | −0.8 |
| mTrx 65 | A12I + A13I + T15I + D23T + R33K + D43E + R44Q + K51R + N56K + D58E + S71M + T74I + Q82K + D85E + Q91K + K93P + K102H | −10.46 | 1.0 |
| mTrx 66 | A12I + A13I + T15I + D23T + R33K + D43E + R44Q + K51R + N56K + D58E + S71M + T74I + D85E + Q91K + K93P + K102H | −10.09 | −1.0 |
| mTrx 67 | A12I + A13I + T15I + D23T + C29S + D43E + R44Q + K51R + N56K + D58E + S71M + T74I + D85E + Q91K + K93P + K102H | −9.70 | −0.8 |
| mTrx 68 | A12I + A13I + T15I + D23T + D43E + R44Q + K51R + N56K + S71M + T74I + D85E + Q91K + K93P + K102H | −9.53 | −1.0 |
| mTrx 69 | K51R + K102H | −2.71 | −2.0 |
| mTrx70 | R44Q + K102H | −2.09 | −3.0 |
| mTrx71 | D23T + K102H | −2.77 | −1.0 |
| mTrx72 | T15I + K102H | −2.41 | −2.0 |
| mTrx73 | D23T + K51R | −4.23 | 0.0 |
| mTrx74 | T15I + D23T | −3.74 | 0.0 |
| mTrx75 | T15I + K51R | −3.61 | −1.0 |
| mTrx76 | T15I + D85E + K93P | −6.96 | −2.0 |
| mTrx77 | D23T + D85E + K93P | −7.75 | −1.0 |
| mTrx78 | R44Q + D85E + K93P | −5.22 | −3.0 |
| mTrx79 | D85E + K93P + K102H | −5.09 | −3.0 |
| mTrx80 | T15I + D23T + K51R | −5.94 | 0.0 |
| mTrx81 | T15I + D23T + D85E + K93P | −6.60 | −1.0 |
| mTrx82 | D23T + R44Q + D85E + K93P | −5.31 | −2.0 |
| mTrx83 | D23T + K51R + D85E + K93P | −8.48 | −1.0 |
| mTrx84 | T15I + D23T + K51R + D85E + K93P | −9.17 | −1.0 |
| mTrx85 | T151 + R44Q + K51R + D85E + K93P | −7.04 | −3.0 |
| mTrx86 | D23T + R44Q + K51R + D85E + K93P + K102H | −7.00 | −3.0 |

As shown in Table 2, 86 thioredoxin mutants obtained a decrease in ΔΔG from −2.22 kcal/mol to −12.40 kcal/mol and an increase in Δ net charge from 0.0 to −3.0.

Figure 2:
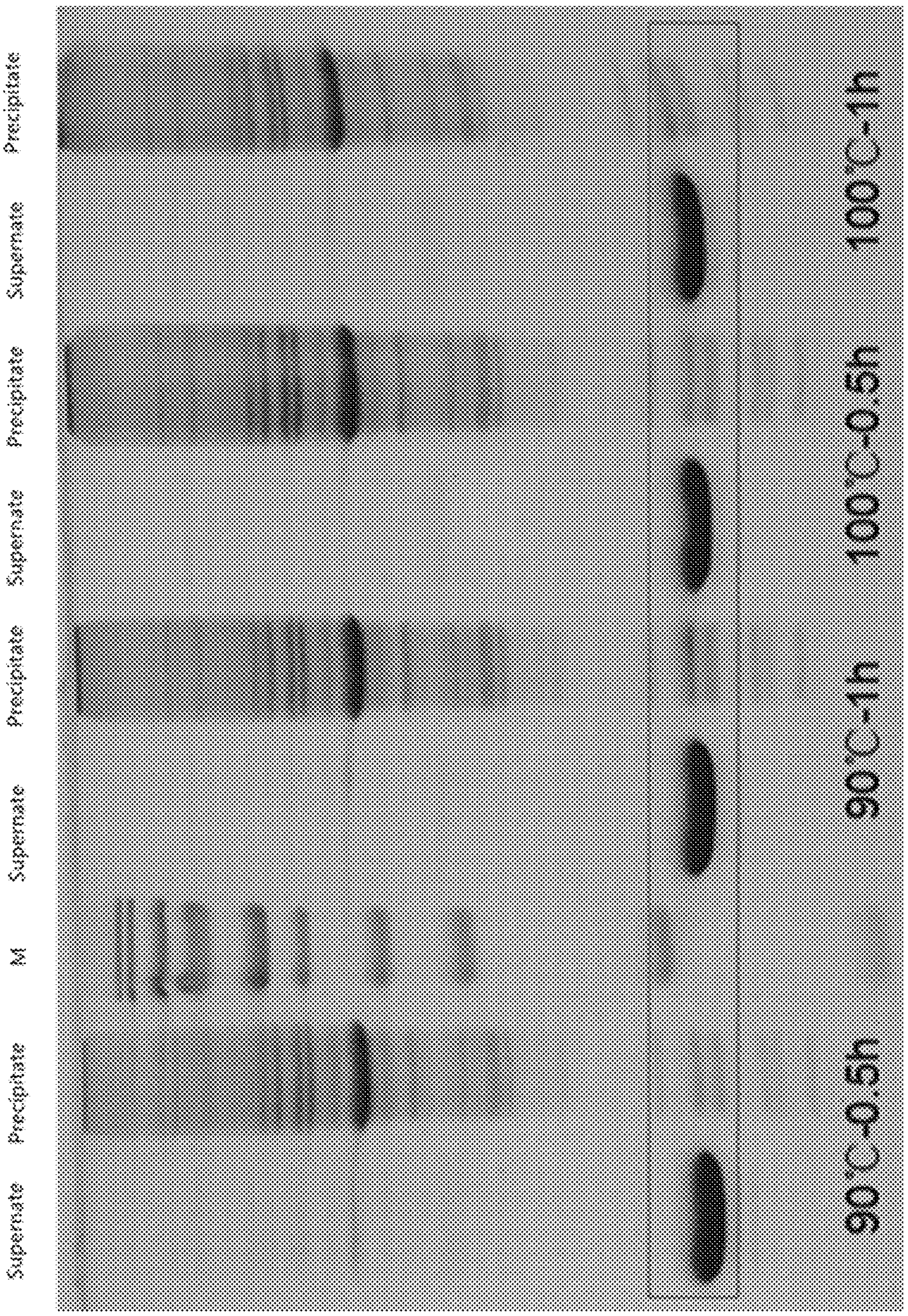
FIG. 2 shows the detection results of SDS-PAGE for the thermal stability and thermal solubility of a part of thioredoxin mutants preferred library.

Step 4) Rescreening of Thermal Stability and Thermal Solubility of Thioredoxin Mutant Library The positive transformants obtained from the preferred library of thioredoxin mutant were inoculated into a 96-deep-well plate containing LB liquid medium with 50 μg/mL kanamycin sulfate, and cultured overnight at 37° C. and 700 rpm. The obtained culture broth was used as a seed, inoculated at 1% inoculum in 24-well plate containing fresh LB liquid medium with 50 μg/mL kanamycin sulfate, and incubated at 37° C. and 500 rpm for 4-6 h. The temperature was adjusted to 30° C., and lactose was added to a final concentration of 2%. The mixture was continually cultured for 20-25 h under shaking condition. The obtained culture medium was mixed with an equal volume of buffer solution and incubated in a water bath at 90° C. and a boiling water bath at 100° C. for 30 min and 60 min, respectively. The samples were collected and centrifuged at 12000 rpm for 3 min, and the supernatant and the precipitate were separately sampled for SDS-PAGE. According to the results of SDS-PAGE optical density, the thermal stability and the thermal solubility of the thioredoxin mutants were analyzed. Some of the screening results are shown in FIG. 2, indicating that compared with intracellular proteins, cell debris, and other impurity proteins in the culture broth, these thioredoxin mutants are soluble and stable under high temperature conditions and do not easily degrade. This also corresponds to the changes in the ΔΔG and Δ net charge properties of the thioredoxin mutant shown in Table 2. Meanwhile, it was also shown that the thioredoxin mutant provided in the present patent can be effectively separated from bacterial intracellular proteins, cell debris and other impurity proteins in the culture broth by one-step centrifugation. According to the results, the positive transformants with significantly less target protein in the supernatant were eliminated, and the rest were added with glycerol and stored in an ultra-low temperature freezer at −80° C.

Step 5) Construction of Thioredoxin Mutant/Arg$^{34}$GLP-1 (9-37) Recombinant Fusion Protein Engineering Strain The recombinant fusion protein (amino acid sequence is SEQ ID NO:6) with the structure of mTrx39-GSGSG-DDDDK-Arg$^{34}$GLP-1(9-37) was constructed with the thioredoxin mutant mTrx39 (amino acid sequence is SEQ ID NO:5) obtained by rescreening of the preferred library of thioredoxin mutants, the linker peptide GSGSG (the single-letter abbreviation of amino acid), and the enterokinase cleavage site DDDDK (the single-letter abbreviation of amino acid). The plasmid construction method was described in such as Chinese Patent No. 201810858509.8, and in particular, the correctly-sequenced single positive transformant described above, i.e. the engineered strain, was inoculated into LB liquid medium containing kanamycin sulfate (50 g/mL) and cultured overnight at 37° C. and 220 rpm. The resultant culture broth was used as seed, and inoculated at 1% inoculum into the fresh LB liquid medium containing kanamycin sulfate (50 μg/mL), that is, 1 mL of seeds was added to 100 mL of fresh medium, then incubated at 37° C. for 4 h. The temperature was adjusted to 30° C., and then IPTG (isopropyl thiogalactoside) was added to a final concentration of 0.4 mM/L. The culture was continually incubated for 20 h under shaking condition. The obtained culture broth was centrifuged at 4000 rpm for 10 min at room temperature. The cell pellets were collected, and the excess cell pellets were stored at −20° C. A certain volume of cell pellets was taken out, to which was added a certain volume of sample loading buffer, and the mixture was boiled for 5 min at 100° C. for preparation of samples. Thus, the recombinant expression vector pET28a-mTrx39/(R34)9-37 was obtained. The expression vector constructed correctly was heat-shocked into *Escherichia coli* BL21 (DE3) and was spread on LB plate medium containing 50 μg/mL kanamycin sulfate. For the preparation of *E. coli* competent cells and heat shock transformation methods, please see "Molecular Cloning Experiment Guide". After the transformants were inoculated and incubated for a suitable period of time, a number of transformants were screened and sent for sequencing. The transformants with the correct sequence are the recombinant engineered strains, which were stored for further use.

Figure 3:
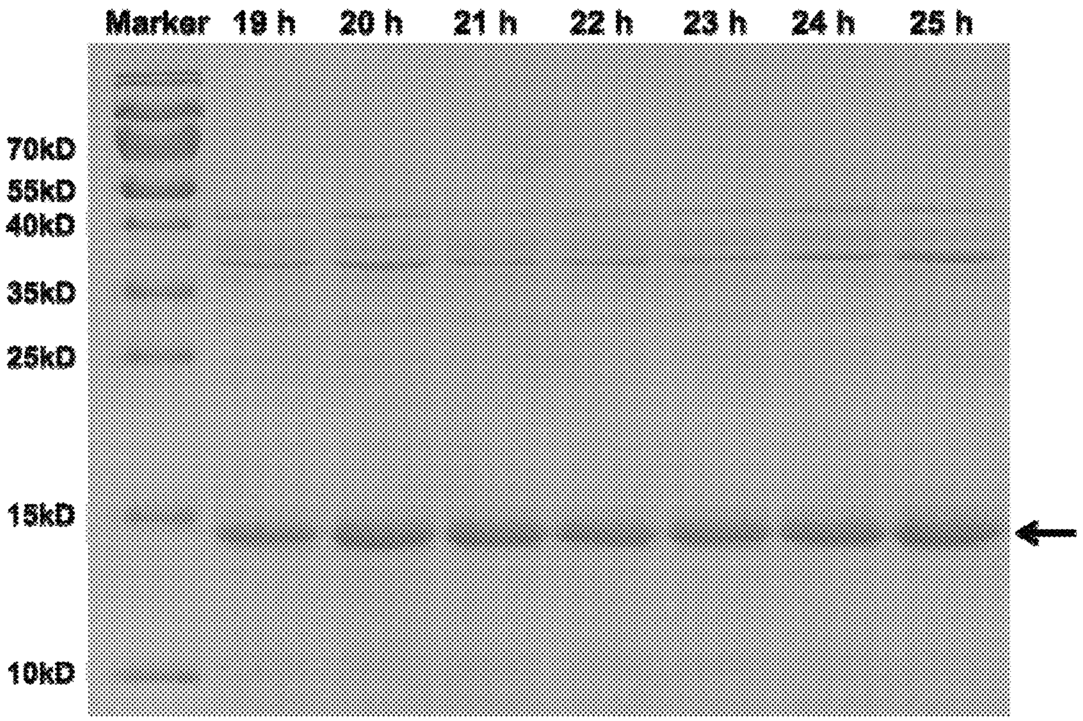
FIG. 3 shows SDS-PAGE detection results of the expression of the recombinant fusion protein mTrx39-GSGSG-DDDDK-Arg$^{34}$GLP-1(9-37) over time during the cultivation of the recombinant engineered strain in a 30 L fermenter. In the Figure, the arrow indicates the band of recombinant fusion protein mTrx39-GSGSG-DDDDK-Arg$^{34}$GLP-1 (9-37).

Step 6) Production of Thioredoxin Mutant/Arg$^{34}$GLP-1 (9-37) Recombinant Fusion Protein The constructed recombinant engineered strains were inoculated from the plate 3 into LB liquid medium containing 50 μg/mL kanamycin sulfate in a shake flask, and cultured at 37° C. and 220 rpm for about 8-12 h. The obtained culture broth was used as the first-level seed, and inoculated at 1% inoculum in a fresh liquid medium of second-level seed medium containing 50 μg/mL kanamycin sulfate: diamine phosphate 0.2%, potassium dihydrogen phosphate 0.675%, citric acid monohydrate 0.093%, magnesium sulfate heptahydrate 0.07%, glucose 2%, trace salt 5 ml/L (trace salt composition: ferrous sulfate heptahydrate 1%, manganese sulfate pentahydrate 0.05%, zinc sulfate heptahydrate 0.225%, copper sulfate pentahydrate 0.1%, sodium tetraborate decahydrate 0.023%, calcium chloride dihydrate 0.2%, ammonium heptamolybdate 0.01%, hydrochloric acid 5 mol/L), and incubated at 34° C. and 220 rpm for about 10-12 h. The obtained culture broth of second-level seed was inoculated into a 30 L fermentor at 2-5% inoculum. The fermentation medium formula was consistent with the second-level seed medium. During fermentation, glucose and magnesium sulfate heptahydrate were added according to the growth of the bacteria. The pH of fermentation was controlled at pH 6.8-7.0 by adding concentrated ammonia water. The pre-fermentation temperature was 37° C., and the feeding was started after 6-8 h of fermentation. When the fermentation was carried out about 10-14 h, the temperature was adjusted to 30° C., and lactose was added to a final concentration of 2%, then the fermentation was continued until 22-26 h. FIG. 3 shows the expression results of recombinant fusion protein (mTrx39-GSGSG-DDDDK-Arg$^{34}$GLP-1 (9-37)) at different fermentation sampling points during the fermentation process detected by SDS-PAGE. From the results, it could be seen that the recombinant fusion protein (mTrx39-GSGSG-DDDDK-Arg$^{34}$GLP-1 (9-37)) showed normal expression level, and no degradation occurred when the fermentation time was extended to 25 h.

Figure 4:
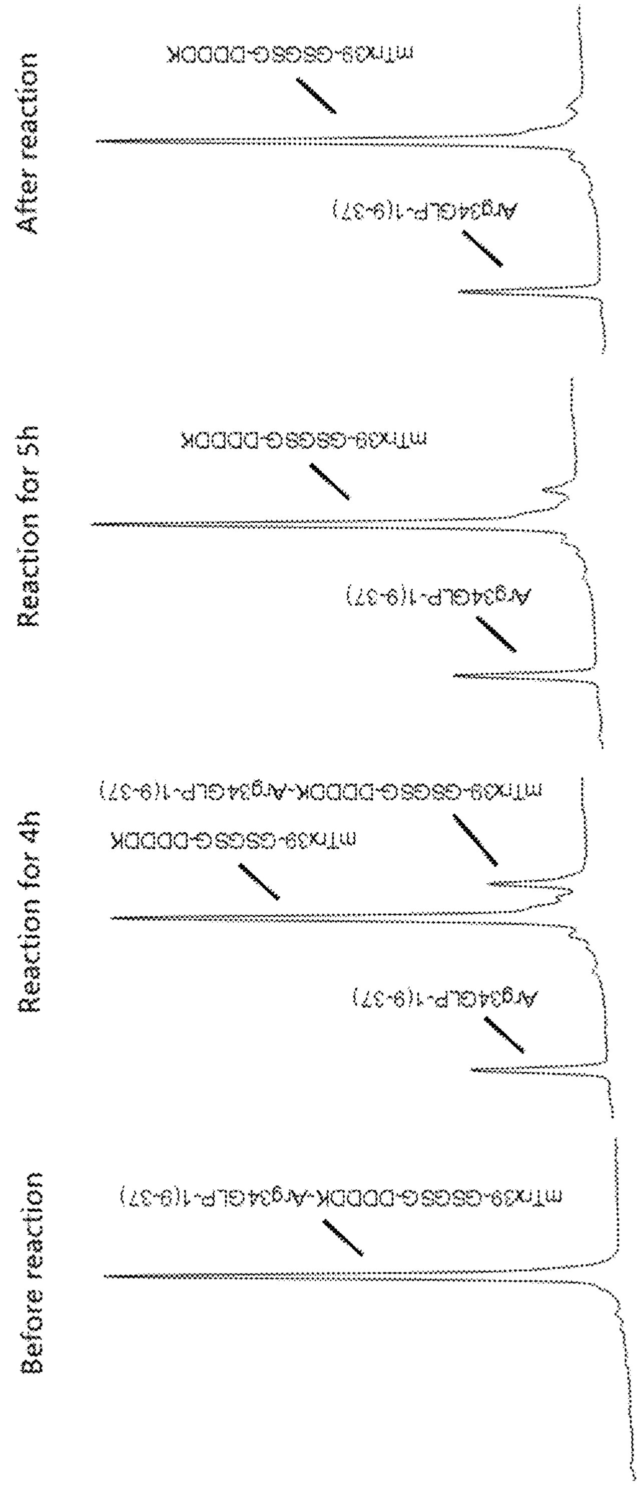
FIG. 4 shows in the cleavage reaction of recombinant enterokinase, the chromatogram of the cleavage of the recombinant fusion protein mTrx39-GSGSG-DDDDK- $Arg^{34}$GLP-1(9-37) into $Arg^{34}$GLP-1(9-37) over time determined by reversed-phase HPLC, and the wavelength is 214 nm, where the abscissa is the detection time, and the ordinate is the response value of UV detection.
Figure 5:
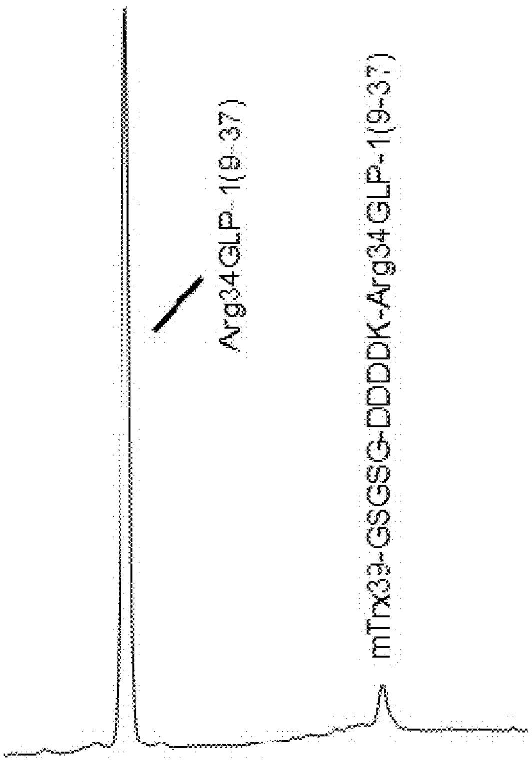
FIG. 5 shows after the $Arg^{34}$GLP-1(9-37) precipitate obtained by isoelectric point precipitation is re-dissolved, the analysis chromatogram is determined by reversed-phase HPLC, where the abscissa is the detection time, and the ordinate is the response value of UV spectrum.

The obtained culture broth was mixed with an equal volume of buffer solution, then incubated in a water bath at 80° C. for about 15 min. The feed solution was discharged, and the supernatant was collected by centrifugation at 12000 rpm in a disc centrifuge. After filtering through a clarifier membrane, 5-10 kD ultrafiltration membrane was used to concentrate 8-10 times, then replaced with the reaction buffer. The feed liquid was transferred into a glass reactor, and recombinant enterokinase was added for digestion at 25° C. for 6-8 h. The pH was adjusted to near the isoelectric point of the target heterologous polypeptide to precipitate Arg$^{34}$GLP-1 (9-37), and then the crude recombinant polypeptide Arg$^{34}$GLP-1 (9-37) was obtained after a plate and frame filter press. FIG. 4 shows the results of sampling and detection of Arg$^{34}$GLP-1 (9-37) obtained from the recombinant fusion protein mTrx39-GSGSG-DDDDK-Arg$^{34}$GLP-1 (9-37) by reversed-phase HPLC analysis. As the progress of the reaction, the target heterologous polypeptide Arg$^{34}$GLP-1 (9-37) was continuously produced, and the recombinant fusion protein mTrx39-GSGSG-DDDDK-Arg$^{34}$GLP-1 (9-37) was continuously cleaved into the recombinant fusion protein mTrx39-GSGSG-DDDDK. By enzyme digestion, 85% of the recombinant fusion protein mTrx39-GSGSG-DDDDK-Arg$^{34}$GLP-1 (9-37) was cleaved, and the crude product of Arg$^{34}$GLP-1 (9-37) with 75% purity was obtained after isoelectric precipitation, as shown in FIG. 5. The target heterologous polypeptide Arg$^{34}$GLP-1 (9-37) with higher purity could be obtained by one-step precipitation. Analysis conditions: YMC-Pack PROTEIN-RP chromatographic column; mobile phase A 20% acetonitrile+0.1% trifluoroacetic acid; mobile phase B 100% acetonitrile+0.1% trifluoroacetic acid; flow rate 1 ml/min; eluent according to the following gradient: 0-8 min mobile phase B increased from 10% to 20%, 8-25 min mobile phase B increased from 20% to 55%; detection wavelength 214 nm; column temperature 35° C.

The present invention is not limited to the above-mentioned optional examples. Anyone can obtain various products under the enlightenment of the present invention, but regardless of any changes in its shape or structure, all the technical solutions within the scope of the claims are within the protection scope of the present invention.

The invention claimed is:

1. A thioredoxin mutant having the amino acid sequence of SEQ ID NO: 1 that consists of a plurality of point mutations, wherein the plurality of point mutations is selected from the group consisting of T15I+K51R; D23T+K51R; D85E+K93P; T15I+K93P; D23T+K93P; K51R+K102H; T15I+K102H; T15I+D23T; D23T+D85E+K93P; T15I+D85E+K93P; K51R+D85E+K93P; R44Q+D85E+K93P; D85E+K93P+K102H; D23T+R440+K51R; R44Q+K51R+D85E; D23T+K51R+D85E+K93P; T15I+K51R+D85E+K93P; T15I+D23T+D85E+K93P; D23T+R44Q+K51R+D85E; R44Q+K51R+D85E+K93P; D23T+R44Q+D85E+K93P; T15I+D23T+K51R+D85E+K93P; D23T+K51R+D85E+K93P+K102H; D23T+R44Q+K51R+D85E+K93P; T15I+R44Q+K51R+D85E+K93P; A12I+N56K+S71M+K93P+K102H; A12I+T15I+N56K+S71M+K102H; T15I+D23T+C29S+R44Q+K51R+D85E; T15I+D23T+R44Q+K51R+D85E+K93P; A12I+D23T+N56K+S71M+K93P+K102H; A12I+N56K+S71M+D85E+K93P+K102H; T15I+D23T+R44Q+K51R+D85E+K93P; D23T+R44Q+K51R+D85E+K93P+K102H; T15I+D23T+R44Q+K51R+D85E+K93P+K102H; T15I+D23T+R44Q+K51R+N56K+D85E+K93P; T15I+D23T+R44Q+K51R+S71M+D85E+K93P; A12I+T15I+D23T+R44Q+K51R+D85E+K93P; A12I+T15I+D23T+R44Q+K51R+D85E+K93P+K102H; T15I+D23T+R44Q+K51R+N56K+D85E+K93P+K102H; T15I+D23T+R44Q+K51R+S71M+D85E+K93P+K102H; T15I+D23T+C29S+R44Q+K51R+D85E+K93P+K102H; A12I+T15I+D23T+R44Q+K51R+N56K+D85E+K93P; T15I+D23T+C29S+R44Q+K51R+N56K+S71M+D85E; A12I+T15I+D23T+R44Q+K51R+N56K+S71M+D85E+K93P; T15I+D23T+D43E+R44Q+K51R+T74I+D85E+Q91K+K93P; T15I+D23T+C29S+R44Q+K51R+S71M+D85E+K93P+K102H; T15I+D23T+R44Q+K51R+N56K+S71M+D85E+K93P+K102H; A12I+T15I+D23T+R44Q+K51R+S71M+D85E+K93P+K102H; A12I+T15I+D23T+C29S+R44Q+K51R+N56K+S71M+D85E+K93P; T15I+D23T+D43E+R44Q+K51R+S71M+T74I+D85E+Q91K+K93P; T15I+D23T+D43E+R44Q+K51R+T74I+D85E+Q91K+K93P+K102H; A12I+T15I+D23T+R44Q+K51R+N56K+S71M+D85E+K93P+K102H; A12I+T15I+D23T+R44Q+K51R+N56K+S71M+D85E+Q91K+K93P+K102H; A12I+T15I+D23T+C29S+R44Q+K51R+N56K+S71M+D85E+K93P+K102H; A12I+T15I+D23T+R44Q+K51R+N56K+S71M+T74I+D85E+K93P+K102H; A12I+T15I+D23T+D43E+R44Q+K51R+N56K+S71M+D85E+K93P+K102H; A12I+T15I+D23T+C29S+R44Q+K51R+N56K+S71M+D85E+Q91K+K93P+K102H; A12I+T15I+D23T+R44Q+K51R+N56K+S71M+T74I+D85E+Q91K+K93P+K102H; A12I+T15I+D23T+D43E+R44Q+K51R+N56K+S71M+D85E+Q91K+K93P+K102H; A12I+T15I+D23T+D43E+R44Q+K51R+N56K+S71M+T74I+D85E+K93P+K102H; A12I+T15I+D23T+C29S+R44Q+K51R+N56K+S71M+T74I+D85E+Q91K+K93P+K102H; A12I+T15I+

D23T+D43E+R44Q+K51R+N56K+S71M+T74I+D85E+Q91K+K93P+K102H; A12I+T15I+D23T+R44Q+K51R+N56K+S71M+T74I+Q82K+D85E+Q91K+K93P+K102H; A12I+T15I+D23T+R44Q+K51R+N56K+D58E+S71M+T74I+D85E+Q91K+K93P+K102H; A12I+T15I+D23T+D43E+R44Q+K51R+N56K+S71M+T74I+Q82K+D85E+Q91K+K93P+K102H; A12I+T15I+D23T+C29S+D43E+R44Q+K51R+N56K+S71M+T74I+D85E+Q91K+K93P+K102H; A12I+A13I+T15I+D23T+D43E+R44Q+K51R+N56K+S71M+T74I+D85E+Q91K+K93P+K102H; A12I+T15I+D23T+R33K+D43E+R44Q+K51R+N56K+S71M+T74I+D85E+Q91K+K93P+K102H; A12I+T15I+D23T+D43E+R44Q+K51R+N56K+D58E+S71M+T74I+D85E+Q91K+K93P+K102H; A12I+A13I+T15I+D23T+C29S+D43E+R44Q+K51R+N56K+S71M+T74I+D85E+Q91K+K93P+K102H; A12I+A13I+T15I+D23T+R33K+D43E+R44Q+K51R+N56K+S71M+T74I+D85E+Q91K+K93P+K102H; A12I+T15I+D23T+D43E+R44Q+K51R+N56K+D58E+S71M+T74I+Q82K+D85E+Q91K+K93P+K102H; A12I+A13I+T15I+D23T+C29S+D43E+R44Q+K51R+N56K+D58E+S71M+T74I+D85E+Q91K+K93P+K102H; A12I+A13I+T15I+D23T+R33K+D43E+R44Q+K51R+N56K+D58E+S71M+T74I+D85E+Q91K+K93P+K102H; A12I+T15I+D23T+R33K+D43E+R44Q+K51R+N56K+D58E+S71M+T74I+Q82K+D85E+Q91K+K93P+K102H; A12I+A13I+T15I+D23T+R33K+D43E+R44Q+K51R+N56K+D58E+S71M+T74I+Q82K+D85E+Q91K+K93P+K102H; A12I+A13I+T15I+D23T+C29S+R33K+D43E+R44Q+K51R+N56K+D58E+S71M+T74I+D85E+Q91K+K93P+K102H; A12I+A13I+T15I+D23T+C29S+D43E+R44Q+K51R+N56K+D58E+S71M+T74I+Q82K+D85E+Q91K+K93P+K102H; and A12I+A13I+T15I+D23T+C29S+R33K+D43E+R44Q+K51R+N56K+D58E+S71M+T74I+Q82K+D85E+Q91K+K93P+K102H.

* * * * *

```
                         SEQUENCE LISTING


<160> NUMBER OF SEQ ID NOS: 6

<210> SEQ ID NO 1
<211> LENGTH: 105
<212> TYPE: PRT
<213> ORGANISM: Geobacillus stearothermophilus

<400> SEQUENCE: 1

Met Ala Ile Val Asn Ala Thr Asp Gln Thr Phe Ala Ala Glu Thr Lys
1               5                   10                  15

Asp Gly Leu Thr Leu Val Asp Phe Trp Ala Pro Trp Cys Gly Pro Cys
            20                  25                  30

Arg Met Ile Ala Pro Val Leu Glu Glu Leu Asp Arg Glu Met Gly Asp
        35                  40                  45

Lys Val Lys Ile Val Lys Val Asn Val Asp Glu Asn Gln Glu Thr Ala
    50                  55                  60

Ser Lys Phe Gly Val Met Ser Ile Pro Thr Leu Leu Val Phe Lys Asn
65                  70                  75                  80

Gly Glu Leu Val Asp Lys Ala Val Gly Tyr Gln Pro Lys Glu Ala Leu
                85                  90                  95

Val Gln Leu Val Gly Lys His Val Ser
            100                 105


<210> SEQ ID NO 2
<211> LENGTH: 105
<212> TYPE: PRT
<213> ORGANISM: Unknown
<220> FEATURE:
<223> OTHER INFORMATION: Bacillaceae

<400> SEQUENCE: 2

Met Ala Ile Val Asn Ala Thr Asp Gln Thr Phe Ala Ala Glu Thr Lys
1               5                   10                  15

Asp Gly Leu Thr Leu Val Asp Phe Trp Ala Pro Trp Cys Gly Pro Cys
            20                  25                  30

Arg Met Ile Ala Pro Val Leu Glu Glu Leu Asp Arg Glu Met Gly Asp
        35                  40                  45

Lys Val Lys Ile Val Lys Val Asn Val Asp Glu Asn Gln Glu Thr Ala
    50                  55                  60

Ser Lys Phe Gly Val Met Ser Ile Pro Thr Leu Leu Val Phe Lys Asn
65                  70                  75                  80

Gly Glu Leu Val Asp Lys Ala Ile Gly Tyr Gln Pro Lys Glu Ala Leu
                85                  90                  95

Val Gln Leu Val Gly Lys His Val Ser
            100                 105


<210> SEQ ID NO 3
<211> LENGTH: 104
<212> TYPE: PRT
<213> ORGANISM: Unknown
<220> FEATURE:
```

<223> OTHER INFORMATION: Anoxybacillus tepidamans

<400> SEQUENCE: 3

```
Met Ala Ile Val Asn Ala Thr Asp Gln Thr Phe Val Thr Glu Thr Ser
1               5                   10                  15

Thr Gly Val Thr Leu Val Asp Phe Trp Ala Pro Trp Cys Gly Pro Cys
            20                  25                  30

Arg Met Ile Ala Pro Val Leu Glu Glu Val Asp Gln Glu Met Gly Asp
        35                  40                  45

Lys Val Lys Ile Val Lys Val Asn Val Asp Glu Asn Gln Glu Thr Ala
    50                  55                  60

Ser Lys Tyr Gly Val Met Ser Ile Pro Thr Leu Leu Val Phe Lys Asp
65                  70                  75                  80

Gly Asn Val Val Asp Lys Thr Val Gly Phe Gln Pro Lys Glu Ala Leu
                85                  90                  95

Val Gln Leu Leu Gln Gln His Val
            100
```

<210> SEQ ID NO 4
<211> LENGTH: 104
<212> TYPE: PRT
<213> ORGANISM: Unknown
<220> FEATURE:
<223> OTHER INFORMATION: Falsibacillus pallidus

<400> SEQUENCE: 4

```
Met Ala Ile Thr Asn Ala Thr Asp Gln Asn Phe Gly Ala Glu Thr Ser
1               5                   10                  15

Gln Gly Leu Val Leu Ala Asp Phe Trp Ala Pro Trp Cys Gly Pro Cys
            20                  25                  30

Lys Met Ile Ala Pro Val Leu Glu Glu Leu Asp Ser Glu Met Gly Asp
        35                  40                  45

Lys Val Lys Ile Val Lys Val Asp Val Asp Glu Asn Gln Glu Thr Ala
    50                  55                  60

Ser Ser Phe Gly Val Met Ser Ile Pro Thr Leu Ile Val Leu Lys Asp
65                  70                  75                  80

Gly Glu Val Val Asp Lys Val Ile Gly Phe Gln Pro Lys Glu Ala Leu
                85                  90                  95

Ala Glu Leu Leu Asn Lys His Ala
            100
```

<210> SEQ ID NO 5
<211> LENGTH: 104
<212> TYPE: PRT
<213> ORGANISM: Artificial Sequence
<220> FEATURE:
<223> OTHER INFORMATION: synthesized

<400> SEQUENCE: 5

```
Met Ala Ile Val Asn Ala Thr Asp Gln Thr Phe Ile Ala Glu Thr Lys
1               5                   10                  15

Asp Gly Leu Thr Leu Val Asp Phe Trp Ala Pro Trp Ser Gly Pro Cys
            20                  25                  30

Arg Met Ile Ala Pro Val Leu Glu Glu Leu Asp Arg Glu Met Gly Asp
        35                  40                  45

Lys Val Lys Ile Val Lys Val Lys Val Asp Glu Asn Gln Glu Thr Ala
    50                  55                  60

Ser Lys Phe Gly Val Met Met Ile Pro Thr Leu Leu Val Phe Lys Asn
```

-continued

```
65                  70                  75                  80

Gly Glu Leu Val Asp Lys Ala Val Gly Tyr Gln Pro Lys Glu Ala Leu
                85                  90                  95

Val Gln Leu Val Gly His His Val
            100


<210> SEQ ID NO 6
<211> LENGTH: 143
<212> TYPE: PRT
<213> ORGANISM: Artificial Sequence
<220> FEATURE:
<223> OTHER INFORMATION: synthesized

<400> SEQUENCE: 6

Met Ala Ile Val Asn Ala Thr Asp Gln Thr Phe Ile Ala Glu Thr Lys
1               5                   10                  15

Asp Gly Leu Thr Leu Val Asp Phe Trp Ala Pro Trp Ser Gly Pro Cys
            20                  25                  30

Arg Met Ile Ala Pro Val Leu Glu Glu Leu Asp Arg Glu Met Gly Asp
        35                  40                  45

Lys Val Lys Ile Val Lys Val Lys Val Asp Glu Asn Gln Glu Thr Ala
    50                  55                  60

Ser Lys Phe Gly Val Met Met Ile Pro Thr Leu Leu Val Phe Lys Asn
65                  70                  75                  80

Gly Glu Leu Val Asp Lys Ala Val Gly Tyr Gln Pro Lys Glu Ala Leu
                85                  90                  95

Val Gln Leu Val Gly His His Val Gly Ser Gly Ser Gly Asp Asp Asp
            100                 105                 110

Asp Lys Glu Gly Thr Phe Thr Ser Asp Val Ser Ser Tyr Leu Glu Gly
        115                 120                 125

Gln Ala Ala Lys Glu Phe Ile Ala Trp Leu Val Arg Gly Arg Gly
    130                 135                 140
```